United States Patent [19]
An et al.

[11] Patent Number: 6,033,488
[45] Date of Patent: Mar. 7, 2000

[54] SOLDER ALLOY

[75] Inventors: Hyung-ki An; Jae-ho Han; In-chul Kim, all of Suwon, Rep. of Korea

[73] Assignee: Samsung Electronics Co., Ltd., Rep. of Korea

[21] Appl. No.: 08/961,021

[22] Filed: Oct. 30, 1997

[30] Foreign Application Priority Data

Nov. 5, 1996 [KR] Rep. of Korea ............... 96-52163
Dec. 31, 1996 [KR] Rep. of Korea ............... 96-80101

[51] Int. Cl.⁷ ............................ B23K 35/24; C22C 13/00
[52] U.S. Cl. ........................................... 148/24; 420/559
[58] Field of Search ............... 148/24, 26; 420/562, 420/559

[56] References Cited

U.S. PATENT DOCUMENTS

| | | | |
|---|---|---|---|
| 5,019,336 | 5/1991 | Liebermann et al. | 420/562 |
| 5,229,070 | 7/1993 | Melton et al. | 148/24 |
| 5,435,857 | 7/1995 | Han et al. | 148/24 |
| 5,851,482 | 12/1998 | Kim | 420/562 |

FOREIGN PATENT DOCUMENTS

| | | |
|---|---|---|
| 59-153857 | 9/1984 | Japan . |
| 3-255637 | 11/1991 | Japan . |
| 4-22595 | 1/1992 | Japan . |
| 7-178587 | 7/1995 | Japan . |
| 7-299584 | 11/1995 | Japan . |
| 7-299585 | 11/1995 | Japan . |
| 8-132278 | 5/1996 | Japan . |

*Primary Examiner*—George Wyszomierski
*Attorney, Agent, or Firm*—Burns Doane Swecker & Mathis L.L.P.

[57] ABSTRACT

A solder alloy includes tin (Sn) of 50–80 wt %, antimony (Sb) of 0.05–10 wt %, silver (Ag) of 0.0001–5 wt %, phosphorus (P) of 0.0001–0.5 wt %, unavoidable impurities, and lead for the remaining wt %. Numerical limitation to the content amount of the respective elements and the rest effects the solder alloy to have an improved fatigue-proof characteristic for a soldering area.

4 Claims, No Drawings

SOLDER ALLOY

BACKGROUND OF THE INVENTION

1. Field of the Invention

The present invention relates to a solder alloy for soldering which is used as a material for mounting electronic parts, and more particularly, to a solder alloy exhibiting an improved fatigue-proof characteristic in a soldering area.

2. Description of the Related Art

Soldering is used mainly for mounting small electronic parts such as a semiconductor ship or a resistor chip on a printed circuit board (PCB). Since the PCB, the electronic parts and the solder alloy usually have different thermal expansion coefficients, the soldering area in a PCB on which parts are mounted at high density is subject to thermal stress generated by heat during soldering so that the grain of the soldering area becomes coarse. Since the soldering area having a coarse grain is brittle, the area can easily crack due to repetitive stresses of external impacts or vibrations. For instance, a fatal defect such as disconnection of a wire of the parts mounted on the board can occur. Therefore, a surface mounting technology using advanced soldering is required to keep pace with the current trends of mounting parts very densely for a compact and light electronic product maintaining superior functionality.

Furthermore, although a binary-eutectic solder alloy of tin (Sn) and lead (Pb) has been used as main constituents, the above-described problem becomes serious since a print pattern and a soldering land of a PCB becomes narrower as in the case of mounting parts at high-density which reduces the amount of lead consumed during soldering.

SUMMARY OF THE INVENTION

To solve the above problem, it is an objective of the present invention to provide a solder alloy exhibiting an improved fatigue-proof characteristic in a soldering area, particularly in a PCB on which parts are mounted at high-density.

Accordingly, to achieve the above objective, there is provided a solder alloy comprising tin (Sn) of 50–80 wt %, antimony (Sb) of 0.05–10 wt %, silver (Ag) of 0.0001–5 wt %, phosphorus (P) of 0.0001–0.5 wt %, and the balance lead and impurities.

It is preferable in the present invention that the solder alloy further comprises at least one element selected from the group consisting of copper (Cu) of 0.01–1 wt %, bismuth (Bi) of 0.01–5 wt %, nickel (Ni) of 0.01–5 wt %, germanium (Ge) of 0.001–0.5 wt %, tellurium (Te) of 0.001–1 wt %, gallium (Ga) of 20 0.001–1 wt %, and indium (In) of 0.001–1 wt %.

Also, according to another aspect of the present invention, there is provided a solder alloy comprising tin (Sn) of 55–70 wt %, antimony (Sb) of 0.05–5.0 wt %, germanium (Ge) of 0.001–0.1 wt %, phosphorus (P) of 0.0001–0.05 wt %, and 25 the balance lead and impurities.

It is preferable in the present invention that the solder alloy further comprises at least one element selected from the group consisting of copper (Cu) of 0.001–0.2 wt %, bismuth (Bi) of 0.001–5.0 wt %, nickel (Ni) of 0.01–0.5 wt %, tellurium (Te) of 0.001–1.0 wt %, gallium (Ga) of 0.001–1.0 wt %, and indium (In) of 0.001–1.0 wt %.

The solder alloys according to the present invention each can be provided not only as a cream solder containing powder thereof and rosin, but also as a wire solder including solder alloy powder and resin.

DETAILED DESCRIPTION OF THE INVENTION

The ingredients and composition of the respective elements added to a solder alloy according to the present invention are set in consideration of the following major properties of the solder alloy.

First, it is much better to have less oxidation of the solder alloy during soldering. That is, metal elements of a melted solder such as tin or lead react with the oxygen in the air forming a metal oxide. Such a metal oxide reduces the combining strength between a PCB and a part soldered thereto. Also, the generation of metal oxide results in a loss of solder alloy and becomes a factor in the creation of cracks after soldering due to subsequent mechanical and thermal stresses.

Second, a solder alloy must have a melting point appropriate for enhancing the soldering quality. If the melting point of the solder alloy is exceedingly high, a high temperature is required for soldering so that durability of combined parts or the circuit board is lowered due to the effects of the high temperature. On the other hand, if the melting point of the solder alloy is exceedingly low, the solder may soften by being influenced by external heat, thereby weakening the combination strength. Also, if the temperatures gap between liquidus and solidus of the solder alloy is exceedingly great, the soldering area may harden non-homogeneously during a freezing process after soldering and thus the combination strength weakens.

Third, spreadability of the solder alloy should be superior in a melted state. That is, since the time consumed in soldering is actually a few seconds, the solder alloy should spread quickly so that mounted parts can be firmly combined.

In consideration of the above-described properties of the solder alloy, the ingredients and composition of the respective elements added to a solder alloy according to a first preferred embodiment of the present invention will be described.

Tin (Sn) is an element affecting the manufacturing costs of a solder alloy. Also, when there is either too much or too little tin in the solder alloy, the melting point of the solder alloy increases and the high temperature deteriorates durability of parts during soldering. Considering the above, a Sn content of 50–80 wt % is added to the solder alloy according to the present embodiment.

Antimony (Sb) is added to increase the strength of the solder alloy. If the content of antimony is high, the solder has a low fluidity so that spreadability and wettability of lead become inferior. Particularly, when the content of the antimony is over 10 wt %, the surface of a melted solder becomes insoluble, causing inferior soldering and defects such as the generation of a bridge. On the other hand, when the content of antimony is equal to or less than 0.05 wt %, there is little effect on the properties of the solder alloy. Thus, antimony of 0.05–10 wt %. is added to the solder alloy of the present embodiment.

Also, silver (Ag) is added to increase the strength of the solder alloy and simultaneously improve the ductility thereof. However, since silver is an expensive element, it is preferable that it is added in small amounts, within a range of not minimizing the effect according to the addition of silver. Thus, in the solder alloy of the present embodiment, silver is added at 0.0001–5 wt %.

Addition of phosphorus (P) in small amounts greatly influences the properties of the solder alloy. That is, phosphorus increases the strength of the solder and restricts oxidation so that the solder becomes stress-proof to thermal stress or vibrations in a soldering area. However, the content of the added phosphorus equal to or less than 0.0001 wt % hardly influences the properties of the solder alloy. On the other hand, when phosphorus is added in an amount that is equal to or greater than 0.5 wt %, the fluidity of the solder alloy is lowered. Therefore, in the solder alloy of the present embodiment, phosphorus is added within a range between 0.0001–0.5 wt %.

The solder alloy of the present embodiment contains lead (Pb) as the remnant. Further, impurities in a small amount may be inevitably included in the solder alloy during a manufacturing process thereof.

Also, to improve the strength of soldering and the lead-wettability, the solder alloy can further include at least one element selected from the group consisting of copper (Cu) of 0.01–1 wt %, bismuth (Bi) of 0.01–5 wt %, nickel (Ni) of 0.01–5 wt %, germanium (Ge) of 0.001–0.5 wt %, tellurium (Te) of 0.001–1 wt %, gallium (Ga) of 0.001–1 wt %, and indium (In) of 0.001–1 wt %.

Table 1 shows the results of experiments comparing amount of oxidation, strength of soldering, spreadability, and creep experiments between the present and conventional solder alloys.

Alloy 1 represented in Table 1 is an eutectic solder alloy of Sn63wt %-Pb37wt % used for soldering of a printed circuit board according to the conventional technology, and alloys (a) through (i) are alloys manufactured under an inert-gas atmosphere according to the first preferred embodiment.

An experiment for measuring the amount of oxidation with respect to the alloy 1 and the alloys (a)–(i) was performed by melting a solder alloy of about 1 kg placed in a container of the same size. Next, oxides generated at the initial stage of melting were removed and then the solder alloy was agitated by an agitator for an hour at a speed of 100 r.p.m. at a temperature of approximately 245° C. Then, oxides generated thereafter were collected and the weight thereof was measured.

An experiment for lead spreadability was performed using a copper plate at about 245° C. An experiment for strength of soldering was conducted by measuring at 10 mm/sec after soldering using a 9-pin connector. Also, as to creep, one portion of a Cu lead wire having a length of 10 cm and a diameter of 0.8 mm was soldered to form a land size of about 2.75 mm on a 25×25 mm board. A weight of 1 kg was tied to the other portion of the Cu lead wire and then placed in a constant-temperature oven of 100° C. Then, the time was measured until the Cu lead wire detached from a soldering area of the board.

As shown in Table 1, the solder alloy according to the present embodiment has less oxidation and exhibits better properties in soldering strength and creep while maintaining a spreadability of the same level as the conventional solder alloy.

A solder alloy according to a second preferred embodiment of the present invention will be described in detail.

The solder alloy according to the second embodiment includes the same elements as those included in the solder alloy of the first embodiment described above except for the addition of germanium (Ge) instead of silver (Ag).

The germanium is included to increase the strength of the solder and simultaneously restrict generation of oxides. However, due to its high price, the germanium is added in a small amount within a range of not minimizing the effect according to the addition of the same. Since there is little effect by the addition of germanium when added in an amount

TABLE 1

|  | Composition (wt %) | | | | | Amount of Oxidation | Strength of Soldering | Spreadability | Creep |
|---|---|---|---|---|---|---|---|---|---|
|  | Sn | Pb | Sb | Ag | P | (g) | (kgf) | (%) | (hr) |
| Alloy 1 | 63 | 37 | — | — | — | 110 | 8.2 | 90 | 1.3 |
| Alloy (a) | 60 | remaining | 1 | 0.05 | 0.005 | 78 | 10.0 | 90 | 1.9 |
| Alloy (b) | 58 | remaining | 1 | 0.05 | 0.005 | 84 | 10.3 | 90 | 1.6 |
| Alloy (c) | 60 | remaining | 1 | 0.05 | 0.01 | 84 | 8.9 | 90 | — |
| Alloy (d) | 58 | remaining | 1 | 0.05 | 0.01 | 83 | 9.1 | 90 | — |
| Alloy (e) | 60 | remaining | 1 | 0.05 | 0.02 | 87 | 9.1 | 89 | — |
| Alloy (f) | 58 | remaining | 1 | 0.05 | 0.02 | 86 | 8.6 | 90 | — |
| Alloy (g) | 62 | remaining | 0.5 | 0 | 0.005 | 73 | 9.0 | 91 | — |
| Alloy (h) | 62 | remaining | 1 | 0 | 0.005 | 79 | 9.3 | 92 | 2.9 |
| Alloy (i) | 62 | remaining | 5 | 0.35 | 0.005 | 95 | 8.0 | 91 | 2.4 | equal to or less than 0.001 wt %, a proper composition of germanium to be added in the solder alloy of the present embodiment is preferably within a range of 0.0001–5 wt %.

The compositions of tin (Sn), antimony (Sb) and lead (Pb) added in the solder alloy according to the present embodiment can be appropriately adjusted according to the amount of germanium added. Preferably, the solder alloy of the present embodiment includes tin of 55–70 wt %, antimony of 0.05–5.0 wt %, germanium of 0.001–0.1 wt %, phosphorus of 0.0001–0.05 wt %, and lead for the remaining wt %.

properties in soldering strength and creep while maintaining a spreadability of the same level as the conventional solder alloy.

TABLE 2

|  | Composition (wt %) | | | | | Amount of Oxidation | Strength of Soldering | Spread-ability | Creep |
|---|---|---|---|---|---|---|---|---|---|
|  | Sn | Pb | Sb | Ag | P | (g) | (kgf) | (%) | (hr) |
| Alloy 2 | 63 | 37 | — | — | — | 110 | 8.2 | 91 | 1.3 |
| Alloy (j) | 63 | remaining | 0.8 | 0.007 | 0.005 | 81 | 9.6 | 90 | 4.2 |
| Alloy (k) | 63 | remaining | 3.5 | 0.01 | 0.008 | 77 | 9.6 | 85 | 1.6 |
| Alloy (l) | 63 | remaining | 2.0 | 0.01 | 0.008 | 87 | 10.2 | 88 | — |
| Alloy (m) | 63 | remaining | 3.5 | 0.005 | 0.005 | 79 | 10.2 | 86 | — |
| Alloy (n) | 58 | remaining | 0.7 | 0.01 | 0.005 | 87 | 8.7 | 92 | — |
| Alloy (o) | 58 | remaining | 0.7 | 0.005 | 0.008 | 82 | 8.7 | 93 | — |
| Alloy (p) | 63 | remaining | 1.0 | 0.005 | 0.005 | 86 | 10.5 | 91 | 3.3 |
| Alloy (q) | 63 | remaining | 0 | 0.01 | 0.005 | 81 | 9.7 | 93 | 1.4 |
| Alloy (r) | 63 | remaining | 0 | 0.005 | 0.005 | 82 | 8.9 | 86 | 1.7 |

As in the above-described embodiment, the solder alloy of the present embodiment can include unavoidably added impurities in a manufacturing process.

Further, to improve the strength of soldering, the solder alloy can further include at least one element selected from the group consisting of copper (Cu) of 0.001–0.2 wt %, bismuth (Bi) of 0.001–5.0 wt %, nickel (Ni) of 0.01–0.5 wt %, tellurium (Te) of 0.001–1.0 wt %, gallium (Ga) of 0.001–1.0 wt %, and indium (In) of 0.001–1.0 wt %.

Table 2 shows the results of experiments comparing amount of oxidation, strength of soldering, spreadability, and creep experiments between the conventional solder alloy and a solder alloy according to a second preferred embodiment of the present invention.

Alloy 2 represented in Table 2 is the eutectic solder alloy of Sn63wt %-Pb37wt % used for soldering a printed circuit board according to the conventional technology, and alloys (j) through (r) are manufactured under an inert-gas atmosphere according to the second preferred embodiment.

An experiment for measuring the amount of oxidation with respect to the alloy 2 and the alloys (j)–(r) was performed by melting a solder alloy of about 1 kg placed in a container of the same size. Next, oxides generated at the initial stage of melting were removed and then the solder alloy was agitated by an agitator for an hour at a speed of 100 r.p.m. at a temperature of approximately 245° C. Then, the oxides generated thereafter were collected and the weight thereof was measured.

An experiment for lead spreadability was performed using a copper plate at about 245° C. An experiment for strength of soldering was conducted by measuring at 10 mm/sec after soldering using a 9-pin connector. Also, as to creep, one portion of a Cu lead wire having a length of 10 cm and a diameter of 0.8 mm was soldered to form a land size of about 2.75 mm on a 25×25 mm board. A weight of 1 kg was tied to the other portion of the Cu lead wire and then placed in a constant-temperature oven of 100° C. Then, the time was measured until the Cu lead wire is detached from a soldering area of the board.

As shown in Table 2, the solder alloy according to the present embodiment had less oxidation and exhibited better According to another aspect of the present invention, a cream solder can be provided which includes a flux for manufacturing a common cream solder including rosin and a solder alloy powder which is formed of the elements and composition of the above-described embodiments.

As described above, according to the present invention, fatigue-proof characteristics in the soldering area can be improved so that durability of a soldered part can be increases. Thus, the generation of a metal oxide during soldering is reduced and raw costs can be lowered through minimization of loss of the solder.

What is claimed is:

1. A solder alloy comprising:

tin (Sn) of 50–80 wt %;

antimony (Sb) of 0.05–10 wt %;

silver (Ag) of 0.0001–0.05 wt %;

phosphorus (P) of 0.0001–0.5 wt %; and the balance lead and impurities.

2. The solder alloy as claimed in claim 1, further comprising at least one element selected from the group consisting of copper (Cu) of 0.01–1 wt %, nickel (Ni) of 0.01–5 wt %, germanium (Ge) of 0.001–0.5 wt %, tellurium (Te) of 0.001–1 wt %, gallium (Ga) of 0.001–1 wt %, and indium (In) of 0.001–1 wt %.

3. A cream solder comprising:

a solder alloy powder which comprises
   tin (Sn) of 50–80 wt %,
   antimony (Sb) of 0.05–10 wt %,
   silver (Ag) of 0.0001–0.05 wt %,
   phosphorus (P) of 0.0001–0.5 wt %, and
   the balance lead and impurities; and a flux including a rosin.

4. The cream solder as claimed in claim 3, wherein said solder alloy powder further comprises at least one element selected from the group consisting of copper (Cu) of 0.01–1 wt %, nickel (Ni) of 0.01–5 wt %, germanium (Ge) of 0.001–0.5 wt %, tellurium (Te) of 0.001–1 wt %, gallium (Ga) of 0.001–1 wt %, and indium (In) of 0.001–1 wt %.

* * * * *